United States Patent
Kim et al.

(10) Patent No.: US 7,088,535 B2
(45) Date of Patent: Aug. 8, 2006

(54) OFF-TRACK RETRY METHOD IN HARD DISK DRIVE

(75) Inventors: Hwa-jun Kim, Suwon-si (KR); Jae-deog Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 42 days.

(21) Appl. No.: 10/677,532

(22) Filed: Oct. 3, 2003

(65) Prior Publication Data
US 2004/0078738 A1 Apr. 22, 2004

(30) Foreign Application Priority Data
Oct. 9, 2002 (KR) .................. 10-2002-0061493

(51) Int. Cl.
*G11B 5/02* (2006.01)
(52) U.S. Cl. .............. 360/53; 360/60; 360/77.04; 360/77.06; 360/31; 360/78.04; 360/77.02
(58) Field of Classification Search ......... 360/77.01, 360/77.02, 77.06, 31, 46, 53
See application file for complete search history.

(56) References Cited

U.S. PATENT DOCUMENTS

| | | | | |
|---|---|---|---|---|
| 5,353,170 A * | 10/1994 | Fung et al. | ........... | 360/53 |
| 5,455,724 A * | 10/1995 | Suzuki et al. | ........... | 360/77.04 |
| 5,521,773 A * | 5/1996 | Suzuki et al. | ........... | 360/77.04 |
| 5,612,845 A * | 3/1997 | Smith | ........... | 360/137 |
| 5,696,643 A * | 12/1997 | Tsuwako et al. | ........... | 360/73.03 |
| 5,731,924 A * | 3/1998 | Yun | ........... | 360/77.08 |
| 5,818,803 A * | 10/1998 | Nakamura et al. | ........... | 369/44.28 |
| 5,936,789 A * | 8/1999 | Mukohara | ........... | 360/77.04 |
| 6,008,962 A * | 12/1999 | Le et al. | ........... | 360/77.08 |
| 6,078,461 A * | 6/2000 | Smith et al. | ........... | 360/77.08 |
| 6,178,054 B1 * | 1/2001 | Wakefield | ........... | 360/31 |
| 6,275,346 B1 * | 8/2001 | Kim et al. | ........... | 360/31 |
| 6,650,491 B1 * | 11/2003 | Suzuki et al. | ........... | 360/31 |
| 6,781,780 B1 * | 8/2004 | Codilian | ........... | 360/60 |
| 6,882,489 B1 * | 4/2005 | Brunnett et al. | ........... | 360/60 |
| 2003/0202268 A1 * | 10/2003 | Wang et al. | ........... | 360/31 |

\* cited by examiner

*Primary Examiner*—David Hudspeth
*Assistant Examiner*—Dismery Mercedes
(74) *Attorney, Agent, or Firm*—Staas & Halsey LLP

(57) ABSTRACT

An off-track retry method for recovering data incorrectly read due to a read error caused by an off-track error in a disk drive. The off-track retry method includes extracting read gain characteristics while varying an off-track amount, determining an off-track amount, i.e., off-track direction and degree, based upon the read gain characteristics, reading data using the determined off-track amount, and determining whether the read data is normal and determining whether the data incorrectly read due to the read error has been recovered based upon the result.

12 Claims, 4 Drawing Sheets

OFF-TRACK RETRY METHOD IN HARD DISK DRIVE

CROSS-REFERENCE TO RELATED APPLICATIONS

This application claims the priority of Korean Patent Application No. 2002-61493, filed on Oct. 9, 2002, in the Korean Intellectual Property Office, the disclosure of which is incorporated herein by reference.

BACKGROUND OF THE INVENTION

1. Field of the Invention

The present invention relates to a method of recovering errors in a hard disk drive (HDD), and more particularly, to an off-track retry method for recovering off-track errors.

2. Description of the Related Art

Data can be recorded on each sector of a hard disk drive (HDD). If an error occurs during recording/reading of data on/from a desired sector of a data storage medium it is possible to try to record/read the data again to the disk head on the desired track of the data storage medium when the desired track comes back again while the data storage medium is rotating, which is called a retry.

There are different retry methods available in a hard disk drive, capable of recovering errors triggered by different causes. One of the retry methods is an off-track retry method.

An off-track error indicates an error occurring when data is recorded off the centerline of a desired track rather than on the centerline of the desired track. Therefore the data cannot be read via a normal tracking method.

When recording data on a hard disk drive, data may be recorded off-track due to repeatable run-out or non-repeatable run-out components inside and outside of the hard disk drive. It is impossible to read-the data from the hard disk drive by a normal tracking method in which a head is placed over the centerline of a track where the data is expected to be.

FIG. 1 is a flowchart of a conventional off-track retry method. Referring to FIG. 1, a disk read command to read data from a specific address of a hard disk drive is applied from a host in operation s102. When data has been recorded off-track at a corresponding address, a read error occurs in operation s104 because it is impossible to read the data via a typical error recovery method.

There may be many reasons for a read error, other than an off-track error. The hard disk drive performs various error recovery methods as part of a retry routine. An off-track retry method is a type of error recovery method.

When a read error occurs, the hard disk drive performs predetermined retry methods including an off-track retry method in order to correct the read error in operation s106.

According to the conventional off-track retry method, a head is forced to be offset from either side of the centerline of a desired track by a predetermined distance in order to determine whether data is read correctly, i.e., whether a read error is recovered. Generally, the head is moved toward either side of the desired track from the centerline of the desired track by as much as ±15%. The degree to which the data is recorded off the centerline of a desired track where the data was supposed to be recorded is represented by a percentage, and '+' and '−' indicating the off-track directions.

Then, it is determined whether the data has been read correctly in operation s108. If the data has been read correctly, the next command is performed in operation s110. If the data has not been read correctly, a read failure is announced in operation s112.

According to the conventional off-track error recovery method shown in FIG. 1, whether the data has been read correctly is determined based upon the result of reading data from places offset either side of the centerline of a desired track in '+' and '−' directions by a predetermined off-track amount.

Since a hard disk drive cannot figure out how far off-track the data is offset from the centerline of a desired track where the data was supposed to be recorded at a predetermined address, it is determined whether or not the data has been read correctly, based upon the result of reading data which is offset from either side of the desired track in '+' and '−' directions by a predetermined off-track amount.

However, the conventional off-track error recovery method has several disadvantages. First, the probability of reading data correctly based upon a predetermined off-track amount is low because a predetermined off-track amount can never be an optimum even though it has been obtained through experiments most likely to read data correctly from an off-track position.

If an arbitrary off-track amount is applied when another error exists in addition to an off-track error, such as a weak write error, the probability of the off-track error recovery method providing successful outcomes is even lower.

A weak Write error is an error where data cannot be written with sufficient write power even though a predetermined write current is normally applied to a head. For example, such a weak write error is more likely to occur on a data-storage medium at low temperatures because the coercive force of the data storage medium increases at low temperatures.

SUMMARY OF THE INVENTION

Accordingly, it is an aspect of the present invention to provide an improved off-track retry method capable of optimizing an off-track retry operation.

Additional aspects and/or advantages of the invention will be set forth in part in the description which follows and, in part, will be obvious from the description, or may be learned by practice of the invention.

The foregoing and/or other aspects of the-present invention are achieved by providing an off-track retry method for recovering data incorrectly read due to a read error caused by an off-track error in a disk drive. The off-track retry method comprises extracting read gain characteristics while varying an off-track amount, determining an off-track amount, i.e., off-track direction and degree, based upon the read gain characteristics, reading data using the determined off-track amount, determining whether the read data is normal and determining whether the data incorrectly read due to the read error has been recovered based upon the result.

Reading the data comprises reading data by moving a head away from the centerline of a track by up to the determined off-track amount, and reading data by moving the head away from the centerline of the track by up to an off-track range having a predetermined difference with the determined off-track amount.

Determining the off-track amount comprises measuring read gains while gradually varying an off-track amount within a predetermined off-track range that does not cause a cross-erase problem, determining an off-track direction based upon the gradient of a curve of the measured read gains, and identifying an off-track amount corresponding to a minimum of the measured read gains.

Determining the off-track amount comprises measuring read gains at three places, on the centerline of a track and a plurality of places at either side of the centerline of the track and determining an off-track direction based upon the gradient of a curve of the measured read gains, measuring read gains while gradually varying an off-track amount within a predetermined off-track range that does not cause a cross-erase problem, and identifying an off-track amount corresponding to a minimum of the measured read gains.

BRIEF DESCRIPTION OF THE DRAWINGS

These together with other aspects and advantages of the invention will become apparent and more readily appreciated from the following description of the preferred embodiments taken in conjunction with the accompanying drawings of which.

DETAILED DESCRIPTION OF THE PREFERRED EMBODIMENTS

Figure 1:
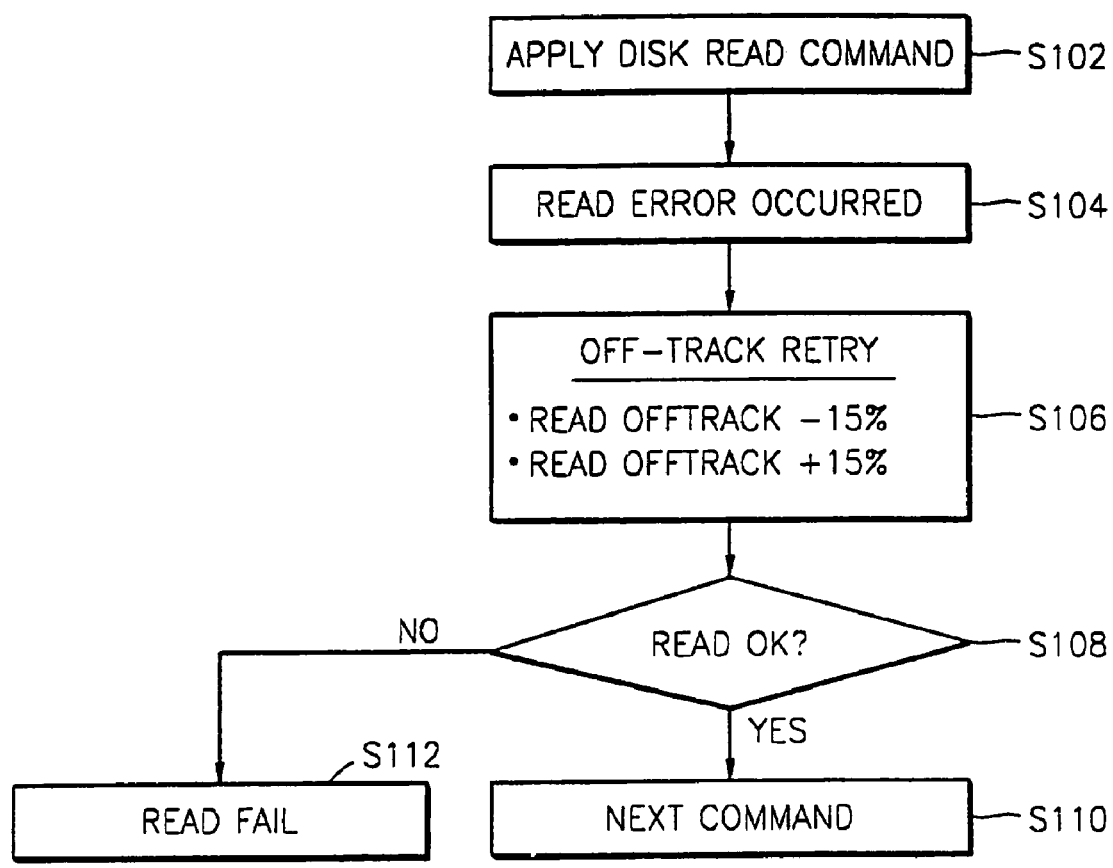
FIG. 1 is a flowchart of a conventional off-track retry method.

Reference will now be made in detail to the present preferred embodiments of the present invention, examples of which are illustrated in the accompanying drawings, wherein like reference numerals refer to the like elements throughout.

Figure 2:
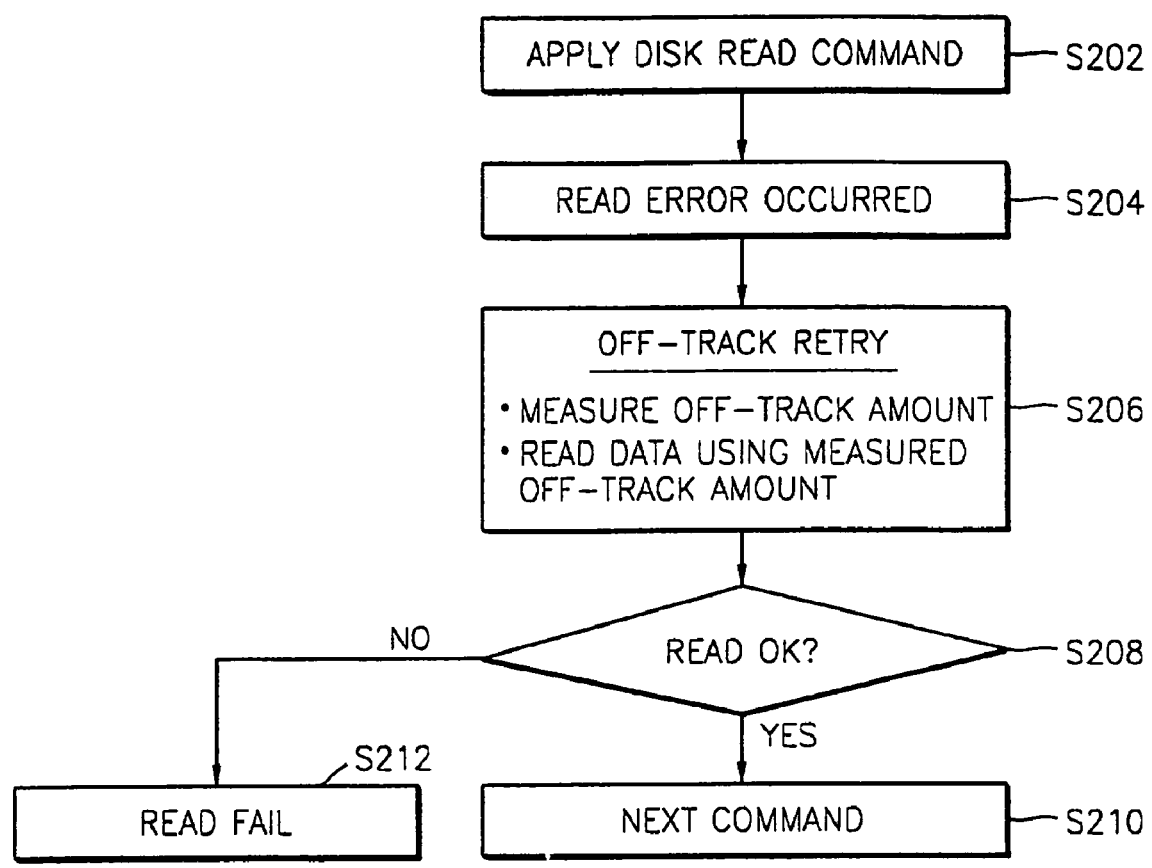
FIG. 2 is a flowchart of an off-track retry method according to an embodiment of the present invention.

FIG. 2 is a flowchart of an off-track retry method according to an embodiment of the present invention. In operation s202 of FIG. 2, a disk read command reads a specific address of a disk.

If data is recorded off-track at the corresponding address, a read error occurs in operation s204 because it is impossible to read the data with a normal tracking method.

When a read error occurs, a hard disk drive performs a retry operation as well as various error recovery methods and an off-track error recovery operation in operation s206.

According to the off-track error recovery method in operation s206, an off-track amount at the corresponding address is determined, and then the data recorded off-track is read with the use of the off-track amount.

It is determined whether the data has been correctly read in operation s208.

If the data has been correctly read, the next command is performed in operation s210. If the data has not been correctly read, the process of reading the data recorded off-track is considered as a failure in operation s212.

According to the off-track error recovery method, an off-track amount is measured at a place where a read error has occurred, and data is read with the use of the measured off-track amount. Thus, the off-track error recovery can provide an optimal solution to a read error caused by an off-track error.

Figure 3:
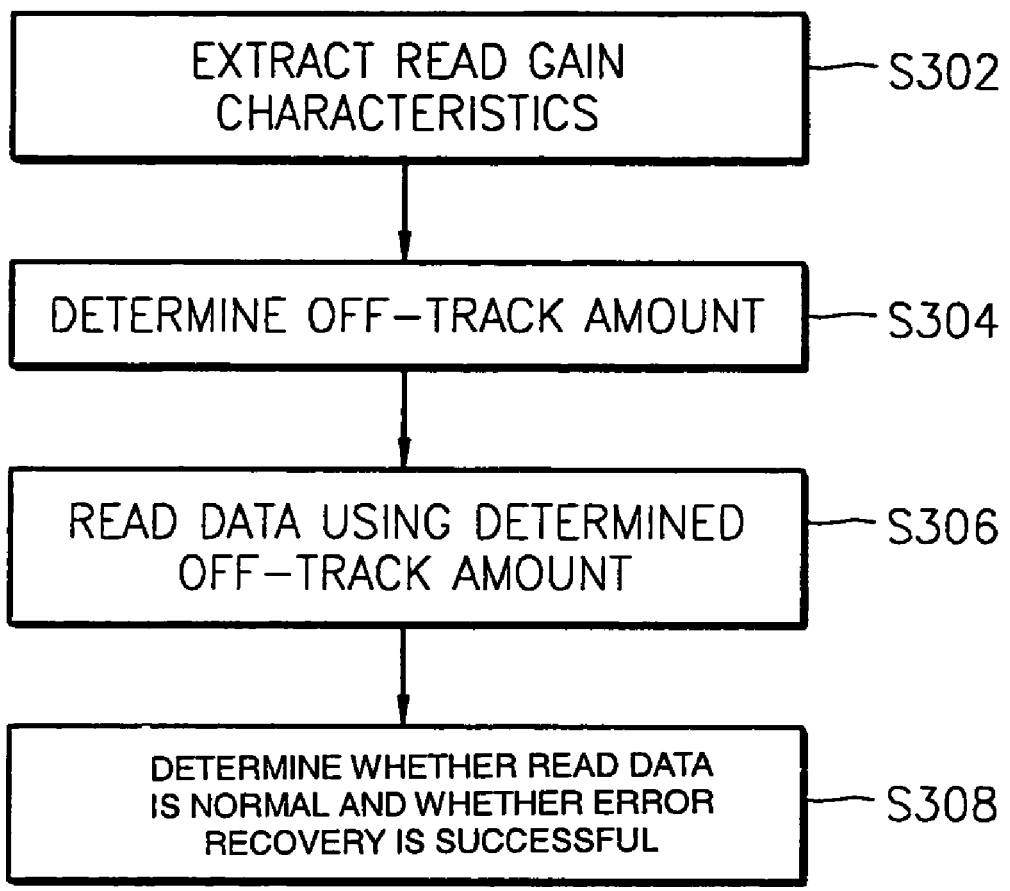
FIG. 3 is a detailed flowchart of the off-track retry method shown in FIG. 2.

FIG. 3 is a detailed flowchart of the off-track retry method shown in FIG. 2. As shown in FIG. 3, the off-track retry method comprises extracting read gain characteristics while varying an off-track amount in operation s302, determining off-track direction and degree based upon the extracted read gain characteristics in operation s304, reading data using a determined off-track amount in operation s306, determining whether the read data is normal and determining whether the error recovery is successful in operation s308 based upon the results.

An off-track amount at a predetermined address is determined, and then data is read with the use of the determined off-track amount. Accordingly, the off-track error recovery method can optimize a retry operation.

Figure 4A:
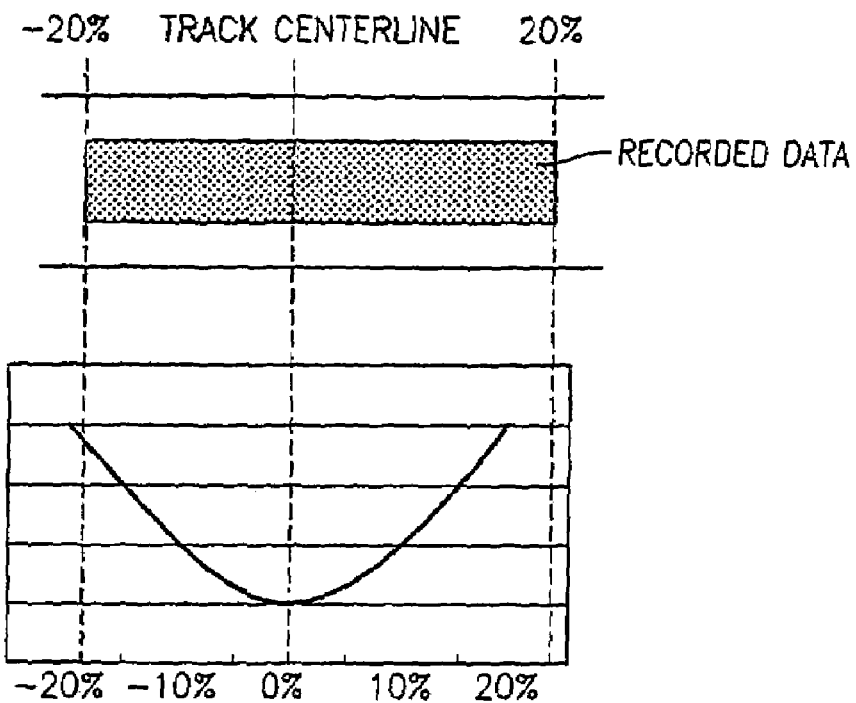
FIGS. 4A and 4B are diagrams illustrating a step of extracting read gain characteristics in the off-track retry method shown in FIG. 2.
Figure 4B:
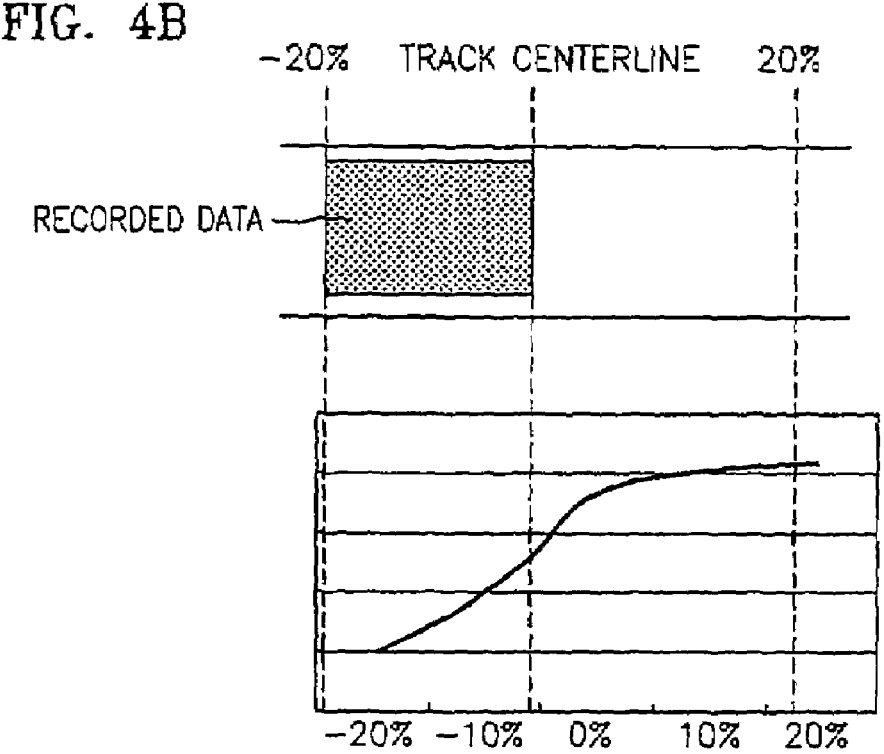

FIGS. 4A and 4B are diagrams illustrating a process of extracting gain characteristics in an off-track retry method. Referring to FIGS. 4A and 4B, the off-track direction and degree are measured using read gains. Read gain characteristics can be obtained by measuring a read gain in each off-track level while gradually increasing an off-track amount, for example, from −20% to +20%.

In a hard disk drive, signals read from a disk are amplified to a predetermined level by a head amplifier. Accordingly, the read gain obtained in the head amplifier varies in inverse proportion to the amplitude of the read signals. For example, when the amplitude of a signal is low, the amount of read gain is high. However, when the amplitude of a signal is high, the amount of read gain is reduced.

In a case where data is normally magnetized, as shown in FIG. 4A, where data is recorded on the centerline of a track, read gain is smallest at a place where the off-track is zero. As the absolute value of an off-track amount increases, read gain also increases in both '+' and '−' directions.

However, in a case where data is magnetized in a '−' direction, as shown in FIG. 4B, where data is recorded in a place which is off the centerline of a desired track toward the center of a disk by −20%, read gain is smallest when the off-track amount reaches −20%. As the off-track amount increases, read gain also increases. However, in a case where data is magnetized in a '+' direction, read gain is smallest when an off-track amount reaches +20%, and as the off-track amount increases, read gain continues to decrease. Accordingly, it is possible to determine off-track direction and degree by using measured read gain characteristics. The off-track amount is varied within a predetermined range that does not cause a cross-erase problem.

In a read gain curve, a place where a smallest read gain is located corresponds to the degree to which data is recorded off-track.

An off-track direction can be identified based upon the gradient of a read gain curve showing read gain characteristics. As shown in FIG. 4B, when a read gain curve has a rising tendency, a '−' direction is determined as an off-track direction. However, when the read gain curve has a falling tendency, a '+' direction is determined as an off-track direction.

There are two different methods of measuring an off-track amount. One is a method of determining the off-track direction and amount at the same time by measuring read gains at different places while gradually varying an off-track amount within a predetermined off-track range, and the other is a method of obtaining an off-track amount by measuring a read gain first at three points, i.e., one point on the centerline of a track and two points at either side of the centerline of the track, determining an off-track direction based upon the results of the measurement, and then measuring read gains in places in the selected off-track direction.

In the first method of measuring an off-track amount, read gains are measured while gradually varying an off-track amount within a predetermined off-track range that does not cause a cross-erase problem. Thereafter, an off-track direction is determined based upon the gradient of a curve of the measured read gains. Then, the read gains are differentiated, and an off-track amount corresponding to a maximum value among the results of the differentiation is obtained.

In the second method, the read gains are measured at three places, i.e., one place on the centerline of a track and two places at either side of the centerline of the track, and then an off-track direction is determined based upon the gradient of a curve of the measured read gains. Thereafter, the read gains are-measured again while gradually varying an off-track amount in a predetermined off-track range that does not cause a cross-erase problem. The measured read gains are differentiated, and then an off-track amount corresponding to the maximum value among the results of the differentiation is obtained.

In the first method, the number of calculations may increase unnecessarily, and therefore, the second method is more effective than the first method.

It is possible to perform an off-track retry operation more effectively using an off-track amount determined in the above method as well as other off-track amounts having a slight difference with the determined off-track amount. For example, when an off-track amount determined through the above method is "x", it is more effective and stable to perform an off-track retry operation by taking advantage of off-track amounts "x+5" and "x−5" as well as "x".

As described above, in the off-track retry method according to the present invention, it is possible to provide an optimal retry operation by precisely measuring an off-track amount right at the place where a read error has occurred and then reading data using a head moved away from the centerline of a track by as much as the measured off-track amount.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An off-track retry method for recovering data incorrectly read due to a read error caused by an off-track error in a disk drive, the off-track retry method comprising:
   extracting and measuring read gain characteristics while gradually varying an off-track amount in both a positive direction and a negative direction off of a centerline of a desired track;
   measuring an off-track amount at a place where the read error has occurred, based upon the measured read gain characteristics;
   reading data using the measured off-track amount;
   determining whether the read data is normal; and
   determining whether the data incorrectly read due to the read error has been recovered.

2. The off-track retry method of claim 1, wherein the reading the data comprises:
   reading the data by moving a head away from a centerline of a track by up to a determined off-track amount; and
   reading the data by moving the head away from the centerline of the track by up to an off-track range having a predetermined difference with the determined off-track amount.

3. The off-track retry method of claim 1, wherein the determining the off-track amount comprises:
   measuring read gains while gradually varying an off-track amount within a predetermined off-track range;
   determining an off-track direction based upon a gradient of a curve of the measured read gains; and
   identifying an off-track amount corresponding to a minimum of the measured read gains.

4. The off-track retry method of claim 1, wherein the determining the off-track amount comprises:
   measuring read gains at a place on the centerline of a track and a plurality of places at either side of the centerline of the track and determining an off-track direction based upon a gradient of a curve of the measured read gains;
   measuring read gains while gradually varying an off-track amount within a predetermined off-track range; and
   identifying an off-track amount corresponding to a minimum of the measured read gains.

5. The off-track retry method of claim 1, wherein the determining of the off-track amount comprises:
   determining an off-track direction and a degree to which data is recorded off-track.

6. The off-track retry method of claim 1, wherein the read gain is smallest when data is magnetized in the negative direction off of a centerline of a desired track and the off-track amount reaches a predetermined off-track amount in the negative direction; and
   the read gain increases as the off-track amount increases.

7. The off-track retry method of claim 1, wherein the read gain is smallest when data is magnetized in the positive direction off of a centerline of a desired track and the off-track amount reaches a predetermined off-track amount in the positive direction; and
   the read gain decreases as the off-track amount increases.

8. An off-track retry method for recovering data comprising:
   measuring an off-track amount at a location where a read error occurs;
   reading data based upon the measured off-track amount;
   determining whether the read data is normal; and
   determining whether the data incorrectly read due to the read error has been recovered,
   wherein the measuring the off-track amount at a location wherein a read error occurs comprises:
   extracting read gain characteristics while varying the off-track amount in a positive direction and a negative direction off of a centerline of a desired track; and
   determining an off-track direction and a degree based upon the read gain characteristics.

9. The off-track retry method of claim 8, wherein the off-track direction is identified based upon a gradient of a read gain curve showing the read gain characteristics.

10. An off-track retry method for recovering data incorrectly read due to a read error caused by an off-track error in a disk drive, the off-track retry method comprising:
    determining an off-track direction and an off-track amount at a place where the read error has occurred and at the same time by measuring read gains at different places while gradually varying the off-track amount within a predetermined off-track range in both a positive direction and a negative direction off of a centerline of a desired track;
    reading data using the determined off-track direction and the off-track amount;
    determining whether the read data is normal; and determining whether the data incorrectly read due to the read error has been recovered.

11. The off-track retry method of claim 10, wherein the off-track direction is identified based upon a gradient of a read gain curve showing the measured read gains.

12. An off-track retry method for recovering data incorrectly read due to a read error caused by an off-track error in a disk drive, the off-track retry method comprising:
obtaining an off-track amount at a place where the read error has occurred by measuring a read gain at three points;
reading the data using the off-track amount obtained;
determining whether the read data is normal; and
determining whether the data incorrectly read due to the read error has been recovered
wherein the obtaining the off-track amount by measuring a read gain at three points comprises:
measuring the read gain at a centerline of a track;
measuring the read gains at a first point and a second point on either side of the ceterline of the track;
determining an off-track direction based upon a gradient of a curve of the measured read gains;
remeasuring the read pains while varying the off-track amount in a predetermined off-track range:
differentiating the measured read gains; and
determining the off-track amount based upon a maximum value of the result of the differentiation.

* * * * *

UNITED STATES PATENT AND TRADEMARK OFFICE
CERTIFICATE OF CORRECTION

PATENT NO. : 7,088,535 B2 Page 1 of 1
APPLICATION NO. : 10/677532
DATED : August 8, 2006
INVENTOR(S) : Hwa-Jun Kim et al.

It is certified that error appears in the above-identified patent and that said Letters Patent is hereby corrected as shown below:

Col. 8, line 5, change "ceterline" to --centerline--

Col. 8, line 8, change "pains" to --gains--

Col. 8, line 9, change "range:" to --range;--

Signed and Sealed this

Sixth Day of February, 2007

JON W. DUDAS
*Director of the United States Patent and Trademark Office*